(No Model.) 3 Sheets—Sheet 1.

A. McDONALD.
MACHINE FOR DRESSING STONE.

No. 277,914. Patented May 22, 1883.

Witnesses
J. N. Piper
E. B. Pratt

Inventor
Alex. McDonald
by R. H. Eddy atty (No Model.) 3 Sheets—Sheet 2.
A. McDONALD.
MACHINE FOR DRESSING STONE.
No. 277,914. Patented May 22, 1883.
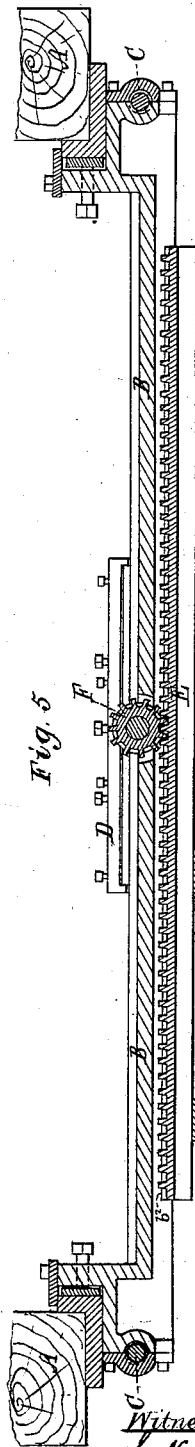
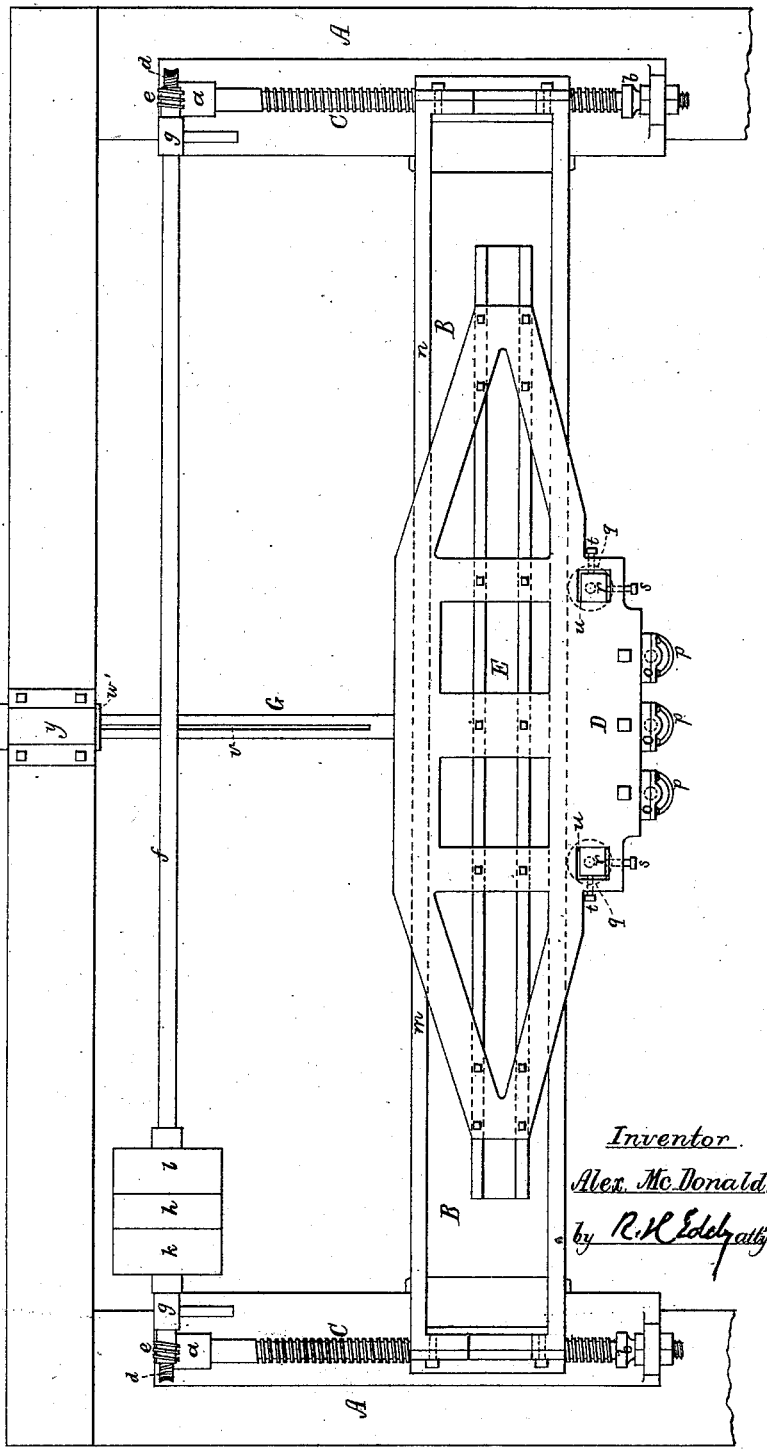
Inventor.
Alex. McDonald,
by R. H. Eddy, atty
Witnesses
J. N. Piper
E. B. Pratt (No Model.)  3 Sheets—Sheet 3.

A. McDONALD.
MACHINE FOR DRESSING STONE.

No. 277,914.  Patented May 22, 1883.

Witnesses.
S. N. Piper
C. B. Pratt

Inventor.
Alexander McDonald
by R. H. Eddy atty.

UNITED STATES PATENT OFFICE.

ALEXANDER McDONALD, OF CAMBRIDGE, MASS., ASSIGNOR TO THE McDONALD STONE CUTTING MACHINE COMPANY, OF NASHUA, N. H.

MACHINE FOR DRESSING STONE.

SPECIFICATION forming part of Letters Patent No. 277,914, dated May 22, 1883.

Application filed February 21, 1883. (No model.)

*To all whom it may concern:*

Be it known that I, ALEXANDER MCDONALD, of Cambridge, in the county of Middlesex, of the Commonwealth of Massachusetts, have invented a new and useful Improvement in Machines for Dressing Stone; and I do hereby declare the same to be described in the following specification and represented in the accompanying drawings, of which—

Figure 1:
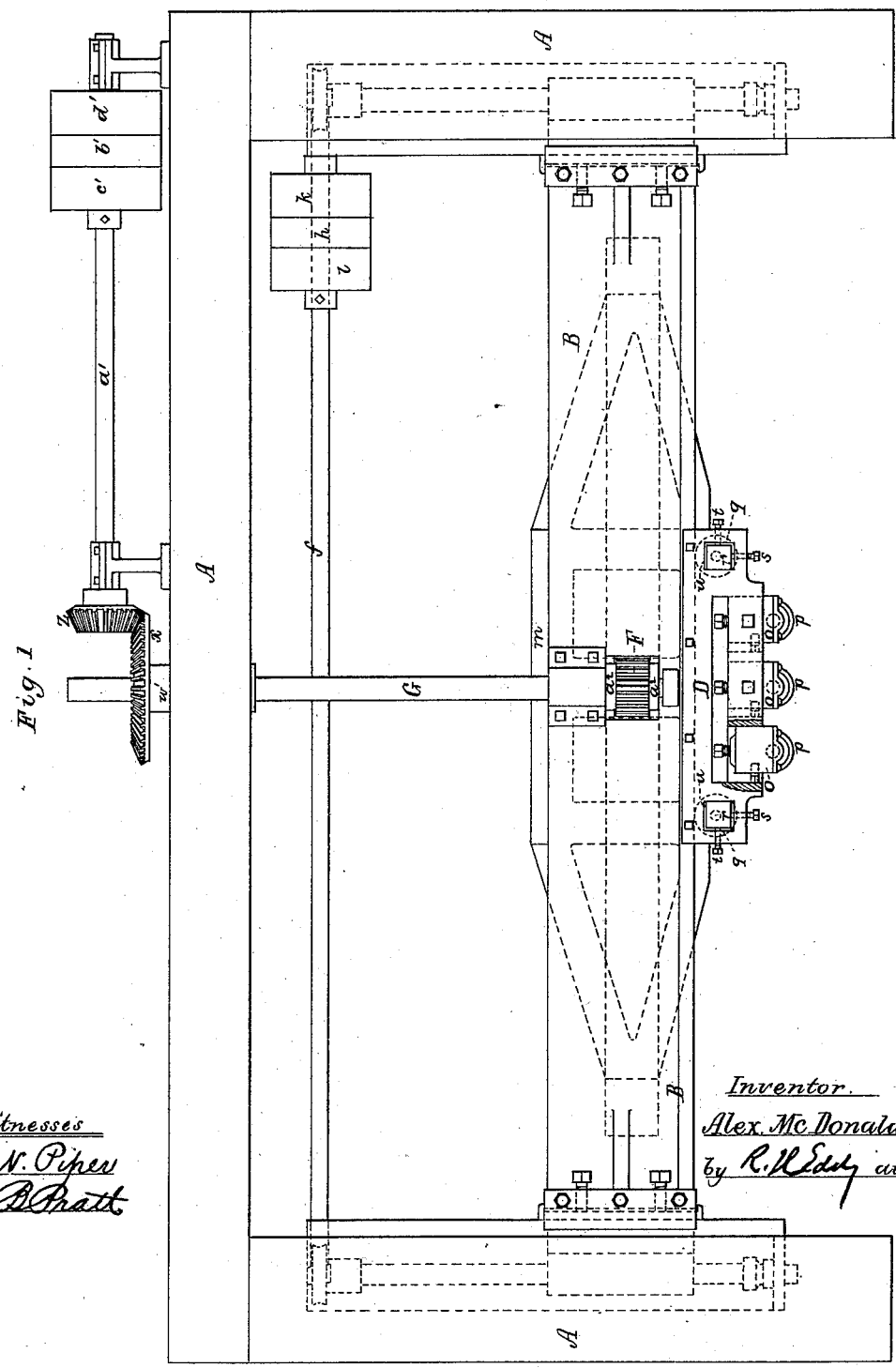
Figure 4:
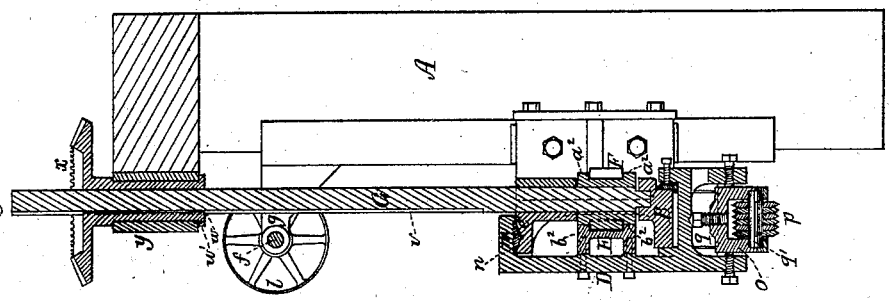
Figure 6:
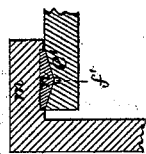
Figure 3:
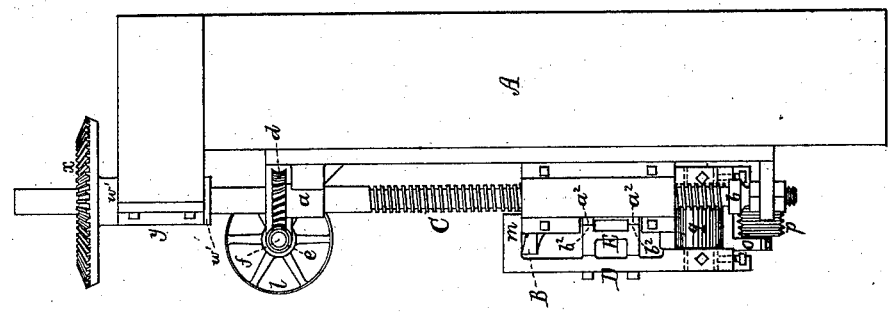

Figure 1 is a front elevation, Fig. 2 a rear elevation, Fig. 3 an end view, Fig. 4 a vertical and median transverse section, and Fig. 5 a horizontal section, of a machine embodying my invention, the nature of which is defined in the claims as presented. Fig. 6 is hereinafter described.

The improvement has special reference to the kind or class of stone-dressing machines as described in the United States Patent No. 262,967, granted to me, and dated August 22, 1882.

In the patented machine the lifting-bar of the cutter-carriage was arranged wholly above such carriage, and was provided with raising-screws having nuts to be separately operated by manual power applied to them, whereas in my present invention the lifting-bar extends within the cutter-carriage, which is furnished not only with a bearing-lip to rest on the top of such bar, but with friction wheels or rollers to work against the lower edge of the bar, and adapted so as to be vertically adjustable relatively to such bar. Furthermore, the cutter-carriage is provided with a toothed rack, and the lifting-bar with a grooved shaft, having a pinion engaging with the said rack, and the grooved shaft is driven by a splined gear, which, supported by the machine-frame, has the shaft adapted to slide vertically through it, (the said gear.) The operative screws of the lifting-bar are furnished with mechanism for automatically and simultaneously revolving them, all of which is productive of new and useful effects and advantage with respect to the said patented machine.

In the drawings, A denotes the frame for supporting the main operative parts.

B is the lifter-bar, through which, near its ends, two vertical screws, C C, screw, and are supported in suitable bearings, $a\ a\ b\ b$, extending from the said frame. Worm-gears $d\ d$ are fixed on the heads of these screws, and engage with worms or screws $e\ e$, carried by a horizontal shaft, $f$, supported in boxes $g\ g$, projecting from the frame A. There is to said shaft a fast pulley, $h$, and two loose pulleys, $k\ l$, they being arranged as shown. Two endless belts, one of which is what is termed a "crossed" belt, is to be employed with the said pulleys, such belts proceeding from a suitable driving-drum, and being provided with means for shifting them alternately upon and off the fast pulley, as occasion may require, to first cause the shaft to be turned one way and next in the opposite direction, such being either to feed the lifting-bar and cutter-carriage downward or to raise them upward, as may be desirable.

The cutter-carriage (shown at D) is arranged alongside of the lifting-bar, and provided with a lip, $m$, to project over the top thereof, such lip being furnished with a re-enforce, $n$, of Babbitt metal or other suitable metal, adapted thereto and separable therefrom. The re-enforce $n$ is a strip extending lengthwise in the lip, which is socketed or grooved to receive it. The re-enforce is convex on its lower side, and enters a corresponding groove or concavity, $e'$, in the lifting-bar, such concavity or groove having at its middle a channel, $f'$, opening out of it. (See Fig. 6, which is a section, on an enlarged scale, of the upper parts of the carriage and lifting-bar.) The channel is to hold oil and to catch any dust that may gather in the groove $e'$. The convex re-enforce $n$ and the concave groove $e'$ serve to prevent the carriage from slipping laterally off the lifter-bar. The cutter-carriage also extends underneath the lifting-bar, and has, as usual, stalls to receive the adjustable cutter-carriers $o$, each of which is provided with a set, $p$, of steel disks sharpened at their edges, and keyed upon a shaft, $q'$. Furthermore, the cutter-carrier has friction-rollers $q\ q$ to bear against the lower edge of the lifter-bar, the journals of each of said rollers being supported in boxes $r$, adjustable vertically in the carriage, which is provided with screws $s$ for effecting such adjustment, and others, $t$, clamping the boxes in position in the carriage, or openings $u$ thereof, in which the boxes are arranged. From this it will be seen that as the bearing-lip or its rail, or the friction-rollers, may become worn by use the latter may be set up to the bar.

The cutter-carriage is provided with a toothed rack, E, extending through it horizontally, and fixed to it. This rack is in engagement with a spur-pinion, F, fixed upon a vertical shaft, G, arranged within and extended above and pivoted in the carriage. This shaft has a straight groove, $v$, made in it lengthwise of it, to receive a spline or feather, $w$, extending within it from the tubular journal or hub $w'$ of a bevel-gear, $x$, such journal being supported in a box, $y$, projecting from the frame A. A bevel-pinion, $z$, fixed on a shaft, $a'$, engages with the gear $x$, such shaft being provided with a fast pulley, $b'$, and two loose pulleys, $c'$ and $d'$, arranged as represented. These pulleys are to be provided with endless belts, one of which should be a crossed belt, and they are to extend around a driving-drum. By means of the rack and pinion and the described operative mechanism of the latter, reciprocating rectilinear movements may be imparted to the cutter-carriage upon the lifting-bar, in order to cause the cutters of the carriage to roll over and upon a stone in one and next in the opposite direction, and in so doing to dress or reduce it.

Figure 7:
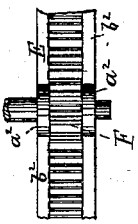

The pinion F is provided with cylindrical bearings $a^2$ $a^2$ to rest circumferentially against straight edges $b^2$ $b^2$, formed on the rack lengthwise thereof, and having the teeth of the rack between them. These cylindrical bearings $a^2$ $a^2$ and straight edges $b^2$ $b^2$ prevent the teeth of the rack from being driven too far into the spaces between those of the pinion, and also support the carriage, so as to prevent it from being borne against the lower part of the lifter-bar to create friction and wear thereof. Fig. 7 is a rear view of the rack and pinion with their straight edges and cylindrical bearings, as set forth.

I claim in the said machine—

1. The cutter-carriage, arranged to extend down in front of and over and beneath the lifter-bar, and provided with a toothed rack, in combination with the pinion fixed on a shaft, not only grooved and pivoted to the lifting-bar, but provided with mechanism for revolving it, (the said shaft,) all being substantially as set forth.

2. The cutter-carriage provided with the grooved lip, and with the convex re-enforce, as and arranged in the groove of the lip as described, in combination with the lifter-bar, having in its upper part the concave groove to receive the re-enforce, such groove opening at its bottom into an oil and dust receiving channel made in the bar, all being substantially as set forth.

ALEXANDER McDONALD.

Witnesses:
R. H. EDDY,
E. B. PRATT.